T. DE YOUNG, Jr.
SUPPLEMENTARY SEAT FOR TWO-WHEEL VEHICLES.
APPLICATION FILED DEC. 20, 1911.
1,037,216.
Patented Sept. 3, 1912.
2 SHEETS—SHEET 1.
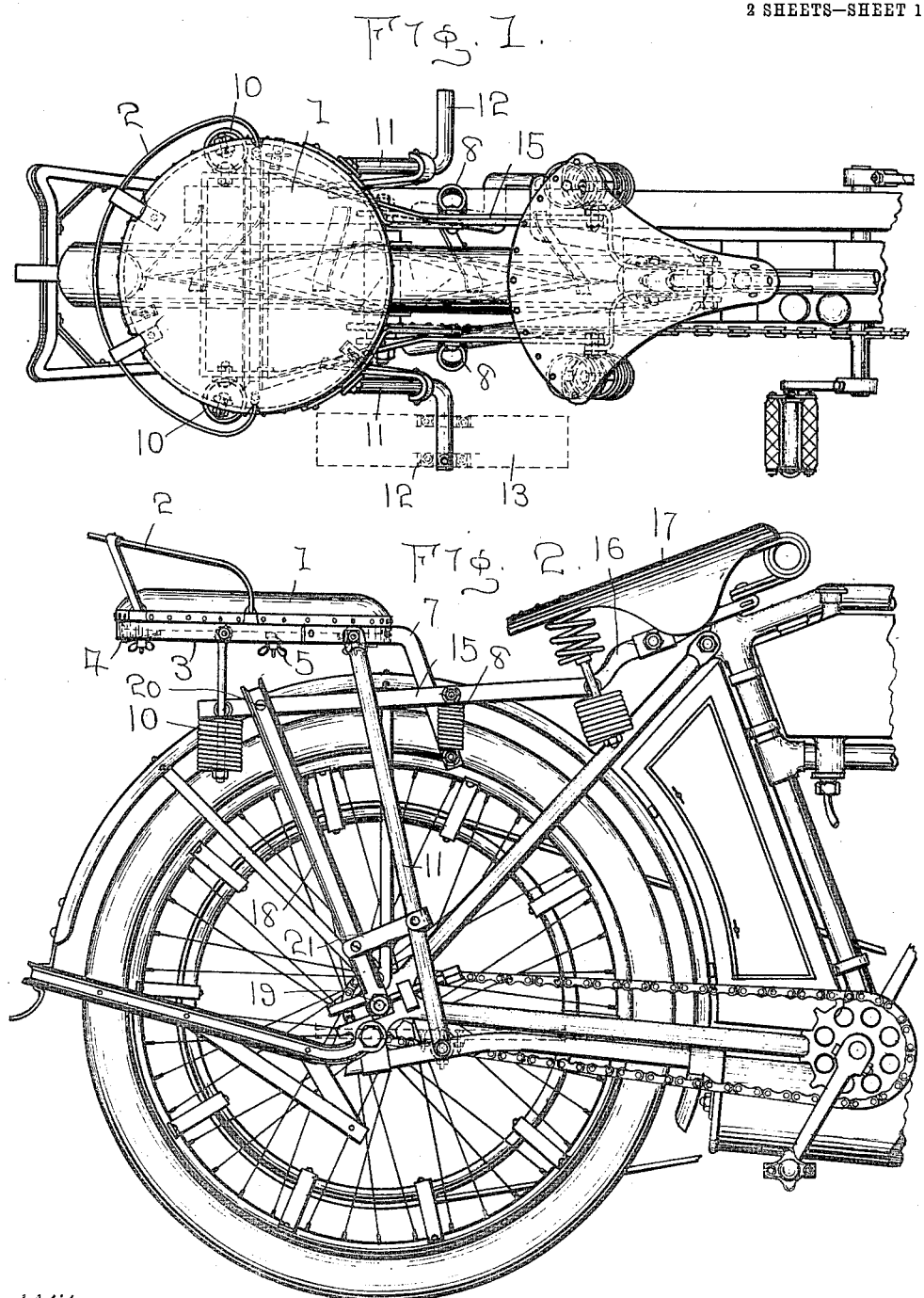
Witnesses
E. Brown
Wm. S. Fowler
Inventor
Teunis De Young Jr.
By W. J. Fitz Gerald Co.,
Attorneys T. DE YOUNG, Jr.
SUPPLEMENTARY SEAT FOR TWO-WHEEL VEHICLES.
APPLICATION FILED DEC. 20, 1911.
1,037,216.
Patented Sept. 3, 1912
2 SHEETS—SHEET 2.
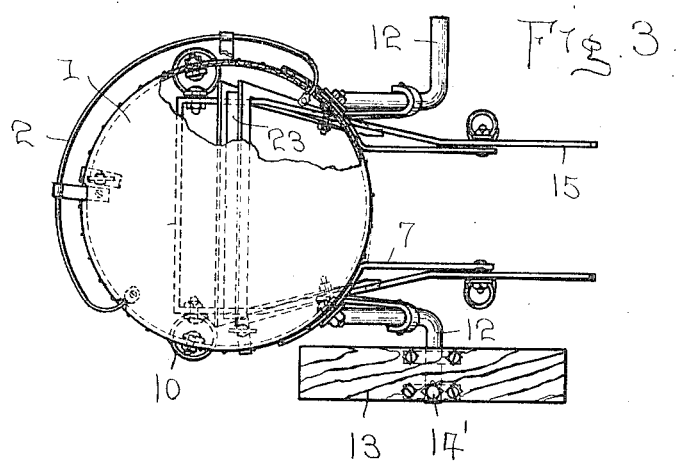
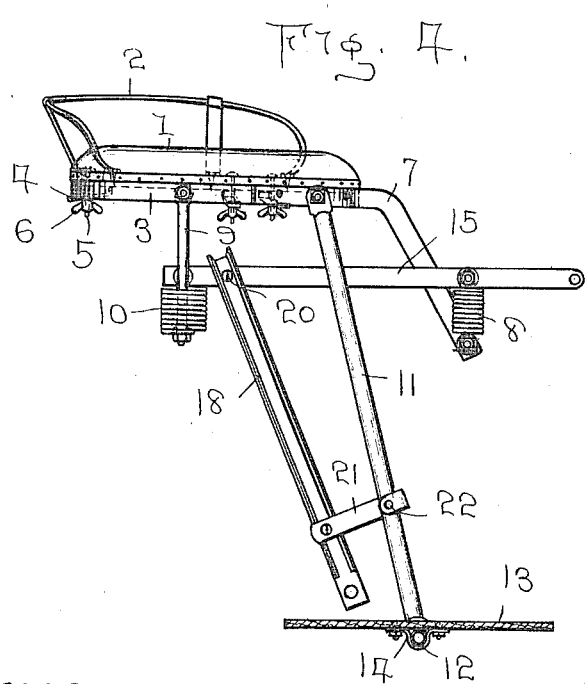
Witnesses
E. Brown,
Wm. S. Fowler
Inventor
Teunis De Young Jr.
By W. J. Fitzgerald Co.
Attorneys

UNITED STATES PATENT OFFICE.

TEUNIS DE YOUNG, JR., OF SOUTH HOLLAND, ILLINOIS.

SUPPLEMENTARY SEAT FOR TWO-WHEEL VEHICLES.

1,037,216.     Specification of Letters Patent.     Patented Sept. 3, 1912.

Application filed December 20, 1911. Serial No. 666,945.

*To all whom it may concern:*

Be it known that I, TEUNIS DE YOUNG, Jr., citizen of the United States, residing at South Holland, in the county of Cook and State of Illinois, have invented certain new and useful Improvements in Supplementary Seats for Two-Wheel Vehicles; and I do hereby declare the following to be a full, clear, and exact description of the invention, such as will enable others skilled in the art to which it appertains to make and use the same.

This invention relates to two-wheel vehicles and more particularly to tandem attachments therefor.

An object of the invention is to provide a tandem attachment which may be readily applied to motor vehicles and the like.

Another object is to provide a tandem attachment of this character which may be connected to the rear axle in such manner that all shocks will be readily absorbed.

A further object is to provide a tandem attachment of this nature, the seat of which may be shifted to different positions to allow the second passenger to face the front of the vehicle or to ride sidewise, as may be desired.

A still further object is to provide an attachment of this character provided with foot rests properly connected with the seat.

Other objects and advantages will be hereinafter set forth and pointed out in the specification and claims.

In the accompanying drawings which are made a part of this application, Figure 1, is a top plan view of the rear portion of a motor-cycle with my tandem attachment applied thereto, Fig. 2, is a side elevation of the same, Fig. 3, is a top plan view of the complete attachment removed, the seat being turned to allow the passenger to ride sidewise, and, Fig. 4, is a side elevation of the same.

Referring more particularly to the drawings in which similar reference numerals designate corresponding parts throughout the several views, 1 represents the seat of the tandem having the railing 2 extending a part of the distance around the seat.
The seat 1 is held in position upon the supporting ring 3 by means of small clamps 4 carried upon the under side of said seat and projecting slightly over the edge of the ring. The clamps 4 are carried upon screws 5 and held in position by the thumb nuts 6 which are screwed tightly against the clamps.

Secured to the ring 3 and projecting forwardly and downwardly therefrom are the arms 7, the forwardly and downwardly extending portions thereof being parallel and having the lower ends of the forward shock absorbing springs 8 secured thereto. Also secured to the ring 3, at opposite sides of the same, are the upper ends of the supporting rods 9 which pass through the rear shock absorbing springs 10 and have their depending ends secured to the lower ends of said springs. The guide rods 11 have their upper ends secured to the ring 3, a short distance rearwardly of the forwardly and downwardly extending portions of the arms 7. The lower ends of the guide rods 11 are turned outwardly as shown at 12, to form foot rests and upon the outwardly directed end 12 of one of the rods 11 is secured a step or platform 13 by means of suitable brackets 14. The platform 13 may be held stationary upon the end 12 by means of a bolt 14' passed through said platform and through the end 12. The purpose of this platform will presently appear.

The upper ends of the shock absorbing springs 8 and 10 are secured at suitable points to the substantially U-shape horizontal member 15, the forward ends of which are pivoted to the rear ends of the seat arms 16 of the forward or main seat 17. It will be understood that the rear portion of the substantially U-shape member 15 is flared to avoid the rear wheel and also to permit of the upper ends of the rear shock absorbing springs 10 being secured thereto, as said springs are spaced much farther apart than the forward springs 8. A second U-shape member 18 has its ends secured upon the opposite ends of the rear axle 19 and extends over the U-shape member 15, forwardly of the point at which the upper ends of the rear springs are secured to said member 15. The second U-shape member is secured to the spring carrying U-shape member 15 by means of suitable screws or bolts 20 passed through said members. Thus the spring carrying member 15 is properly supported above the rear axle 19.

The connecting links 21 have one end pivoted to the U-shape member 18 near the lower ends thereof while their opposite ends are bent around and pivoted to the guide rods 11, as shown at 22. Thus the connecting links 21 not only serve to connect the guide rods 11 with the U-shape supporting member 18, but also serve to limit the movement of said rods in their upward and downward movements as will be clearly understood. The U-shape supporting member 18 has its sides flared toward their upper ends to meet the flat horizontal portion 23 positioned over the horizontal spring carrying U-shape member 15 and beneath the seat 1.

As will be seen, this attachment may be readily secured upon any motor-cycle or the like and the seat 1 secured so that the second passenger may either face the front of the vehicle or ride sidewise, as desired, it being only necessary to loosen the thumb nuts 5 and adjust the seat, after which said nuts may be tightened. When the seat 1 is in its position shown in Figs. 1 and 2, the passenger rests each foot on one of the lower outwardly turned ends 12 of the guide rods 11. If the step or platform 13 is secured to one end 12, however, one foot may be placed upon this platform. This platform may also serve as a step to assist the passenger in reaching the seat 1. The weight of the passenger will necessarily cause the springs 8 and 10 to stretch or expand, forcing the guide rods 11 downwardly, the links 21 serving to guide the rods 11 in the proper direction and limit the movement of the same, as will be understood. It will be evident that the springs 8 and 10 will readily absorb all shocks such as caused by the tires coming in contact with stones or other obstacles or depressions in the road.

When the seat 1 is in the position shown in Figs. 3 and 4, it is ready to receive the side passenger who, instead of placing each foot on one of the turned ends 12 of the guide rods 11, will rest one or both feet upon the platform 13. In either position, however, the rail 2 serves to hold the passenger in proper position upon the seat 1.

It will thus be seen that I have provided a tandem attachment for two-wheel vehicles which may be readily secured upon a motor vehicle or the like for either a front or side passenger. It will also be evident that this attachment will be highly efficient in use and as the parts are detachably connected, any of said parts may be readily replaced should they become worn or broken without destroying the remainder of the attachment.

What I claim is:

1. A device of the class described comprising a seat, means for supporting the seat and allowing resilient movement thereof, said seat being removably secured to the supporting means, means for removably securing said seat in various positions upon the supporting means, means for guiding the seat in its resilient movement, and means for securing the supporting means to a vehicle axle.

2. A device of the class described comprising a seat, a movable ring for supporting the seat, said seat being removably secured upon the ring and adapted to be placed in various positions thereupon, supporting means for the ring, and guiding means for the ring.

3. The combination with a vehicle, of a supporting frame for a supplementary seat, a ring to receive the supplementary seat, a supplementary seat removably secured upon the ring, resilient connections between the ring and the supporting frame, guiding means connected with the ring and the supporting frame, foot rests carried by the guiding means, and means for removably securing the seat in adjusted position upon the ring.

In testimony whereof I have signed my name to this specification in the presence of two subscribing witnesses.

TEUNIS DE YOUNG, JR.

Witnesses:
T. DE YOUNG, Sr.,
EFFIE DE YOUNG.